US012518330B1

(12) United States Patent
Bhyat et al.

(10) Patent No.: US 12,518,330 B1
(45) Date of Patent: Jan. 6, 2026

(54) POST-INCARCERATION DIGITAL RE-ENTRY PLATFORM

(71) Applicant: Securus Technologies, LLC, Carrollton, TX (US)

(72) Inventors: Zain Bhyat, McKinney, TX (US); Alisha Shoates James, Brentwood, TN (US); Charles Barrasso, Franklin, MA (US); Susan Elizabeth Harrod, Quincy, IL (US)

(73) Assignee: Securcus Technologies, LLC, Carrolltton, TX (US)

( * ) Notice: Subject to any disclaimer, the term of this patent is extended or adjusted under 35 U.S.C. 154(b) by 406 days.

(21) Appl. No.: 18/052,002

(22) Filed: Nov. 2, 2022

(51) Int. Cl.
| | |
|---|---|
| *G06Q 50/22* | (2018.01) |
| *G06Q 10/10* | (2023.01) |
| *G06Q 50/20* | (2012.01) |
| *G06Q 50/26* | (2012.01) |

(52) U.S. Cl.
CPC ........... *G06Q 50/22* (2013.01); *G06Q 10/103* (2013.01); *G06Q 50/2057* (2013.01); *G06Q 50/26* (2013.01)

(58) Field of Classification Search
CPC ....... G06Q 50/22; G06Q 10/103; G06Q 50/26
See application file for complete search history.

(56) References Cited

U.S. PATENT DOCUMENTS

| | | | |
|---|---|---|---|
| 11,151,279 B1 * | 10/2021 | Townsend, III | ....... G06Q 20/14 |
| 11,757,958 B1 * | 9/2023 | Lubbehusen | ........... H04L 67/02 |
| | | | 709/224 |
| 2018/0276777 A1 * | 9/2018 | Brillinger | .......... G06Q 50/2057 |
| 2019/0026702 A1 * | 1/2019 | Hodge | ................... H04L 51/214 |
| 2020/0302811 A1 * | 9/2020 | Beaty | ...................... G06F 17/11 |
| 2022/0335555 A1 * | 10/2022 | Karthik | .................. G06N 20/00 |

OTHER PUBLICATIONS

David Mansell "It's an inside job". The Guardian. Apr. 19, 2005 (Year: 2005).*

(Continued)

*Primary Examiner* — Lynda Jasmin
(74) *Attorney, Agent, or Firm* — Fogarty LLP

(57) ABSTRACT

A post-incarceration digital re-entry platform establishes asynchronous communication between an incarcerated individual and a correctional facility assigned supervisor for re-entry counseling support by granting the incarcerated individual access to a post-incarceration re-entry application program (app) on an incarcerated individual personal communication and/or media device (IID) and enabling access by the supervisor to the incarceration re-entry platform. The incarceration re-entry platform maintains this asynchronous communication by presenting identified incarcerated individual need(s) and/or objective(s) to the supervisor; accepting assignment of task(s) to be completed by the incarcerated individual to achieve the need(s) and/or objective(s) from the supervisor; notifying the incarcerated individual, via the app, of the task(s); tracking progress in completing each task; and reporting completion and/or progress to the supervisor. The IID is adapted for use in the correctional facility and provides an interface, via the app, to accept identification of the need(s) and/or objective(s) by the incarcerated individual.

18 Claims, 4 Drawing Sheets

(56) References Cited

OTHER PUBLICATIONS

Travaini GV, Pacchioni F, Bellumore S, Bosia M, De Micco F. Machine Learning and Criminal Justice: A Systematic Review of Advanced Methodology for Recidivism Risk Prediction. Int J Environ Res Public Health. Aug. 22, 2022;19(17):10594. doi: 10.3390/ijerph 191710594. PMID: 36078307; PMCID: PMC9517748 (Year: 2022).*

* cited by examiner

POST-INCARCERATION DIGITAL RE-ENTRY PLATFORM

TECHNICAL FIELD

The present disclosure relates generally to embodiments of a digital platform which facilitates returning citizens released from correctional facilities, specifically to release of incarcerated individuals from correctional facilities.

BACKGROUND

Generally, incarcerated individuals convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated.

Correctional facilities typically assign a supervisor to an incarcerated individual, early in the incarceration process, to help the incarcerated individual work through the reasons for their incarceration, and particularly, as the incarcerated individual approaches their release date, the supervisor works with the incarcerated individual to help transition the incarcerated individual to the outside. They periodically meet in person, where the incarcerated individual is given an opportunity to communicate their needs for when they leave the correctional facility. These needs may typically be for housing, education, a job, food, a skill, etc. This process is typically tracked through physical, in person, communication and extensive paperwork, and it is only during such in-person visits that the incarcerated individual is able to communicate their needs. These existing methods are expensive, slow and do not allow for easy tracking or visibility. While there are many resources available to soon to be released incarcerated individuals, it is difficult for an assigned supervisor to know what is available for each incarcerated individual, and difficult to track what each incarcerated individual has completed and needs to complete. Further it is difficult for correctional facilities to track success of programs and to track supervisor success rates.

Additionally, over the past several years, there has been a sharp increase in the U.S.'s incarcerated individual population that has not been followed by a proportional increase in the number of correctional facility staff. To the contrary, budget pressures in local, state, and federal governments have made it difficult for correctional facilities to maintain an adequate number of wardens, officers, and other administration personnel. Hence, many correctional facilities are often unable to provide sufficient, if any pre-release services to incarcerated individuals.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide a digital platform which facilitates returning citizens released from correctional facilities, specifically to release of incarcerated individuals from correctional facilities. A post-incarceration digital re-entry platform may include a server, or the like, configured to establish asynchronous communication between an incarcerated individual and a correctional facility assigned supervisor of the incarcerated individual for re-entry counseling support. This asynchronous communication may be established by granting, via an incarcerated individual personal communication and/or media device, the incarcerated individual access to a post-incarceration re-entry application program (app), on the incarcerated individual personal communication and/or media device and enabling access by the correctional facility assigned supervisor of the incarcerated individual to the post-incarceration digital re-entry platform. To such ends, the post-incarceration re-entry server may send a message or a notification to the incarcerated individual to grant the incarcerated individual access to the post-incarceration re-entry app on the incarcerated individual personal communication and/or media device.

The post-incarceration re-entry server may maintain this asynchronous communication between the incarcerated individual and the correctional facility assigned supervisor of the incarcerated individual for re-entry counseling support by presenting one or more identified needs and/or one or more identified objectives to the correctional facility assigned supervisor of the incarcerated individual. The incarcerated individual personal communication and/or media, which is adapted for use in a correctional facility, may be configured to provide an interface, via the post-incarceration re-entry app, to accept, from the incarcerated individual, identification of one or more needs and/or one or more objectives. Additionally, the post-incarceration re-entry server may also be configured to accept identification of one or more needs and/or one or more objectives, from the correctional facility assigned supervisor of the incarcerated individual, and/or from a court or agency having jurisdiction over the incarcerated individual.

To maintain the asynchronous communication the post-incarceration re-entry server may also accept assignment, by the correctional facility assigned supervisor, to the incarcerated individual, of one or more tasks to be completed by the incarcerated individual to achieve each of the one or more needs and/or one or more objectives identified. To such ends, the post-incarceration re-entry server may use machine learning to develop a needs and goals action plan to address the one or more needs and/or one or more objectives identified, use machine learning to suggest programs, plans and organizations, drawn from a catalog of available programs, plans and organizations, to fulfill the action plan, and present the suggested available programs, plans and organizations to fulfill the action plan to the correctional facility assigned supervisor of the incarcerated individual, as one or more tasks to be completed by the incarcerated individual. The incarceration re-entry platform server may additionally, or alternatively, use machine learning to perform a risk and needs assessment to address causes of incarceration of the incarcerated individual, use machine learning to suggest programs, plans and organizations, drawn from a catalog of available programs, plans and organizations, to address at least the needs identified by the assessment, and present suggested available programs, plans and organizations to address at least the needs identified by the assessment to the correctional facility assigned supervisor of the incarcerated individual, as one or more tasks to be completed by the incarcerated individual. The post-incarceration re-entry server may also use machine learning to rank and prioritize suggestions drawn from the catalog of available programs, plans and organizations, based, at least in part, on a record of outcomes, based at least in part, on prior results, for presentation to the correctional facility assigned supervisor of the incarcerated individual, as one or more tasks to be completed by the incarcerated individual.

To maintain the asynchronous communication the post-incarceration re-entry server may also notify the incarcerated individual, via the post-incarceration re-entry app, on the incarcerated individual personal communication and/or media device, of the one or more tasks to be completed by the incarcerated individual to achieve each of the one or more needs and/or one or more objectives. The incarcerated individual personal communication and/or media device may present an interface, via the post-incarceration re-entry app, to access one or more education platforms, job platforms and/or housing platforms, each providing one or more respective educational programs, job opportunities and/or housing opportunities, identified in the one or more tasks to be completed by the incarcerated individual. Additionally, or alternatively the incarcerated individual personal communication and/or media device may present, via the post-incarceration re-entry app, an interface to access one or more vendors outside the correctional facility, each vendor associated with one or more of the one or more tasks to be completed by the incarcerated individual.

Also, to maintain the asynchronous communication, the post-incarceration re-entry server may also track and/or accept input from the incarcerated individual indicating, via the post-incarceration re-entry app, progress in completing, and/or completion of, each of the one or more tasks by the incarcerated individual. Additionally, to maintain the asynchronous communication the post-incarceration re-entry server may report to the correctional facility assigned supervisor of the incarcerated individual the completion of, and/or the progress in completing, each of the one or more tasks by the incarcerated individual.

Additionally, the post-incarceration re-entry server may accept, identification of one or more needs and/or one or more objectives from a third party having a vested interest in the incarcerated individual, notify this third party of the one or more tasks to be completed by the incarcerated individual to achieve each of the one or more needs and/or one or more objectives, and may report completion of, and/or progress in completing, each of the one or more tasks by the incarcerated individual to the third party.

Additionally, the post-incarceration re-entry server may provide web-based access to the one or more education platforms, job platforms and/or housing platforms, to the incarcerated individual following release of the incarcerated individual from the correctional facility In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
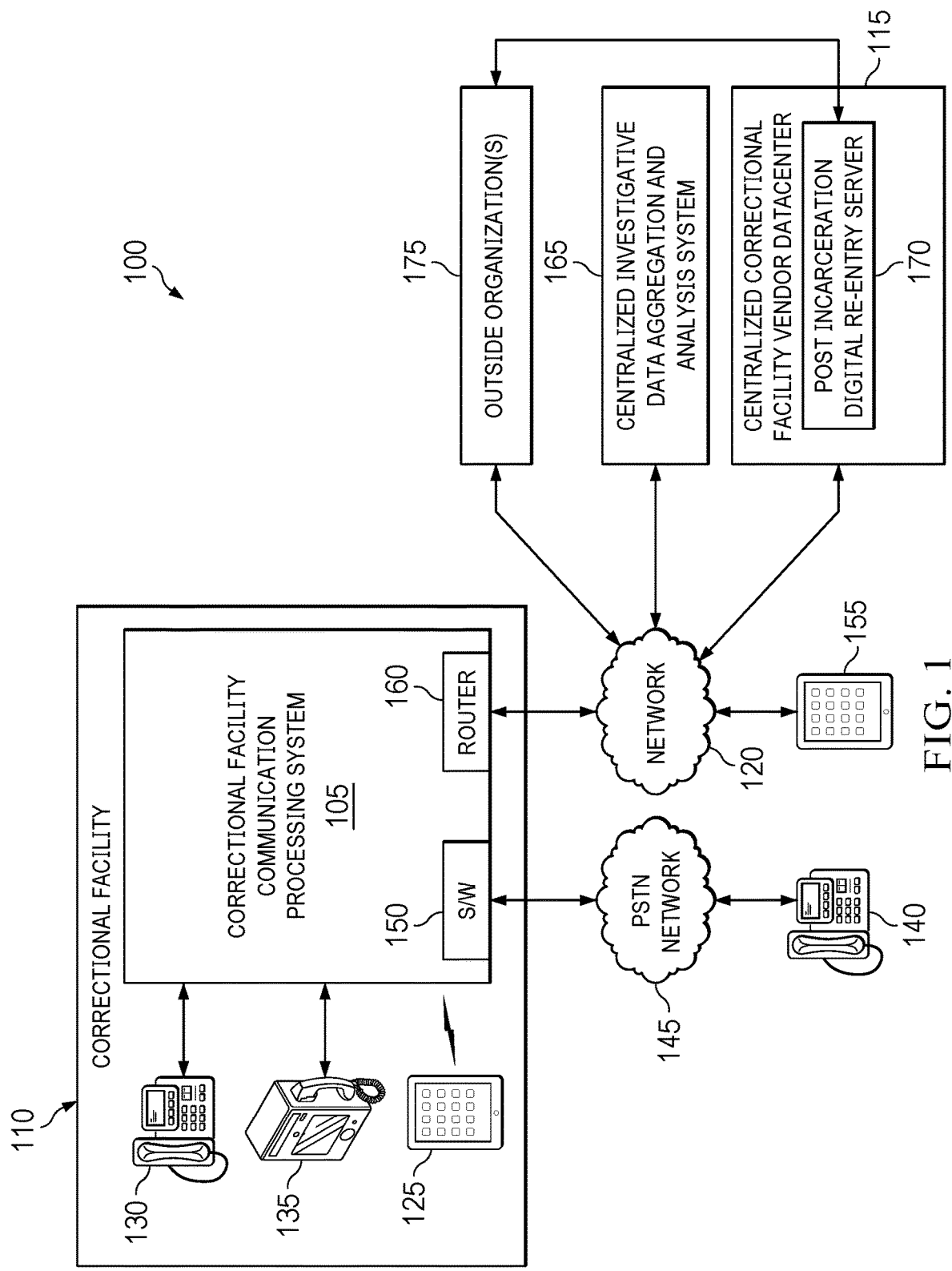
Figure 2:
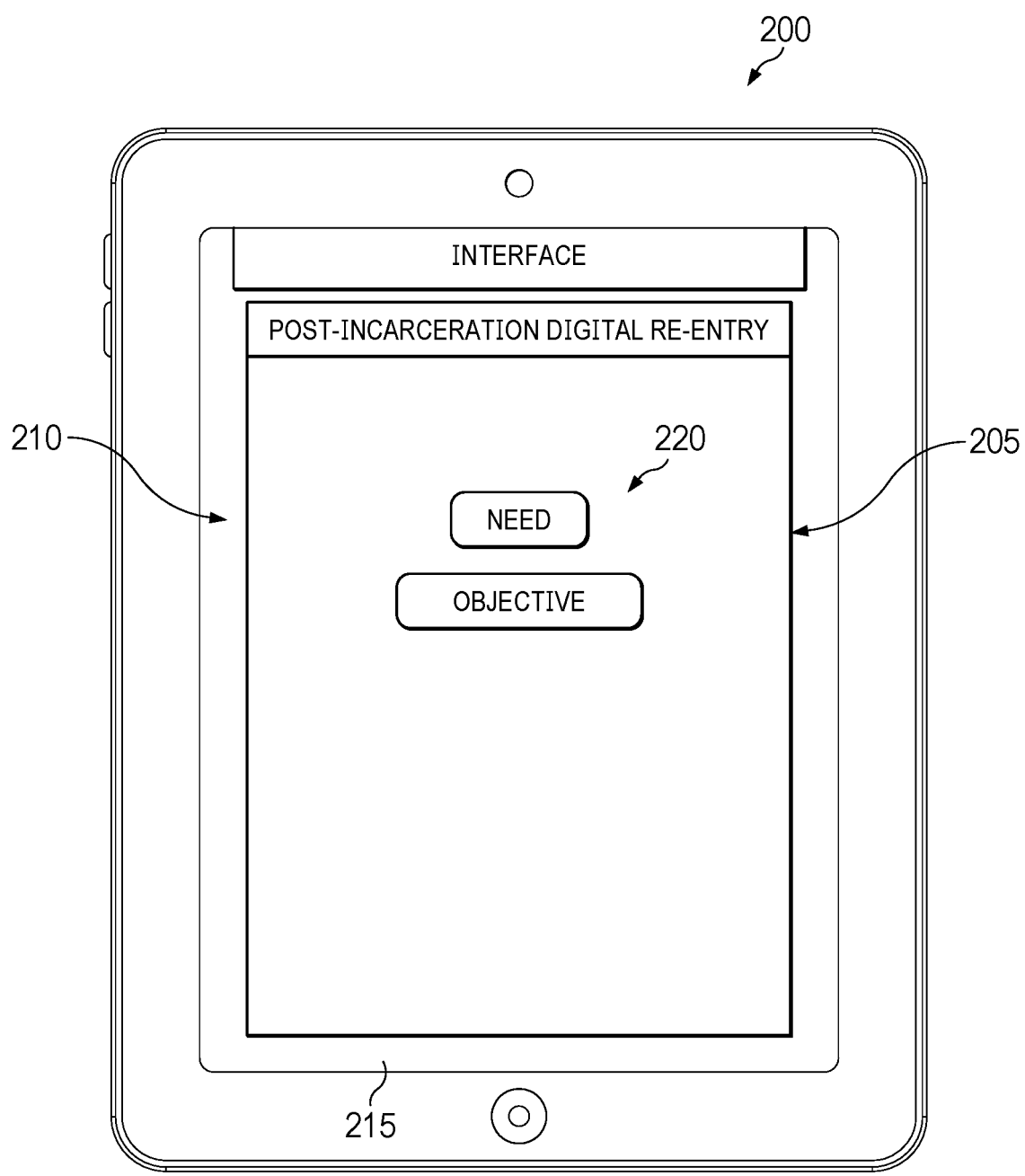
Figure 3:
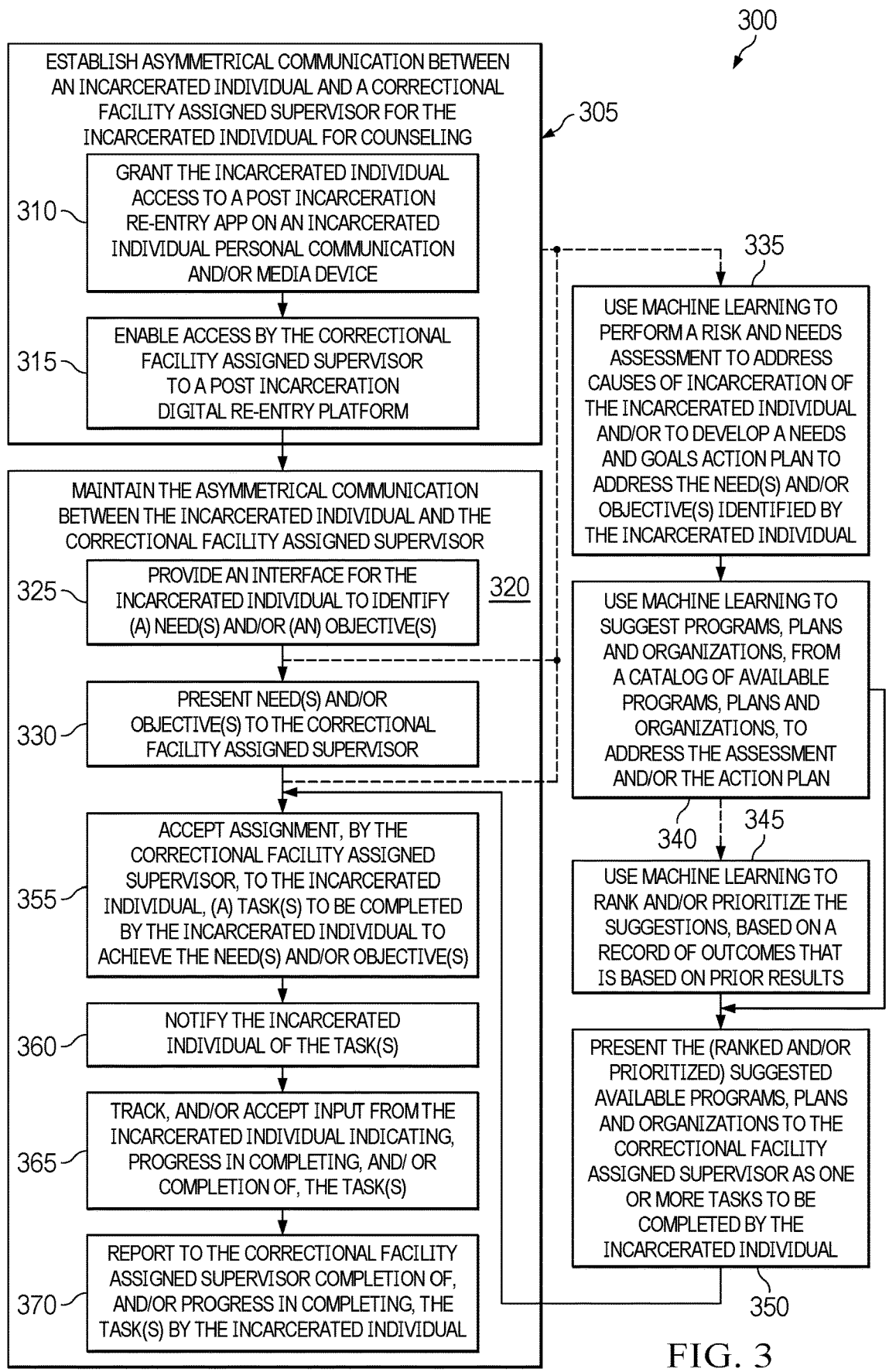
Figure 4:
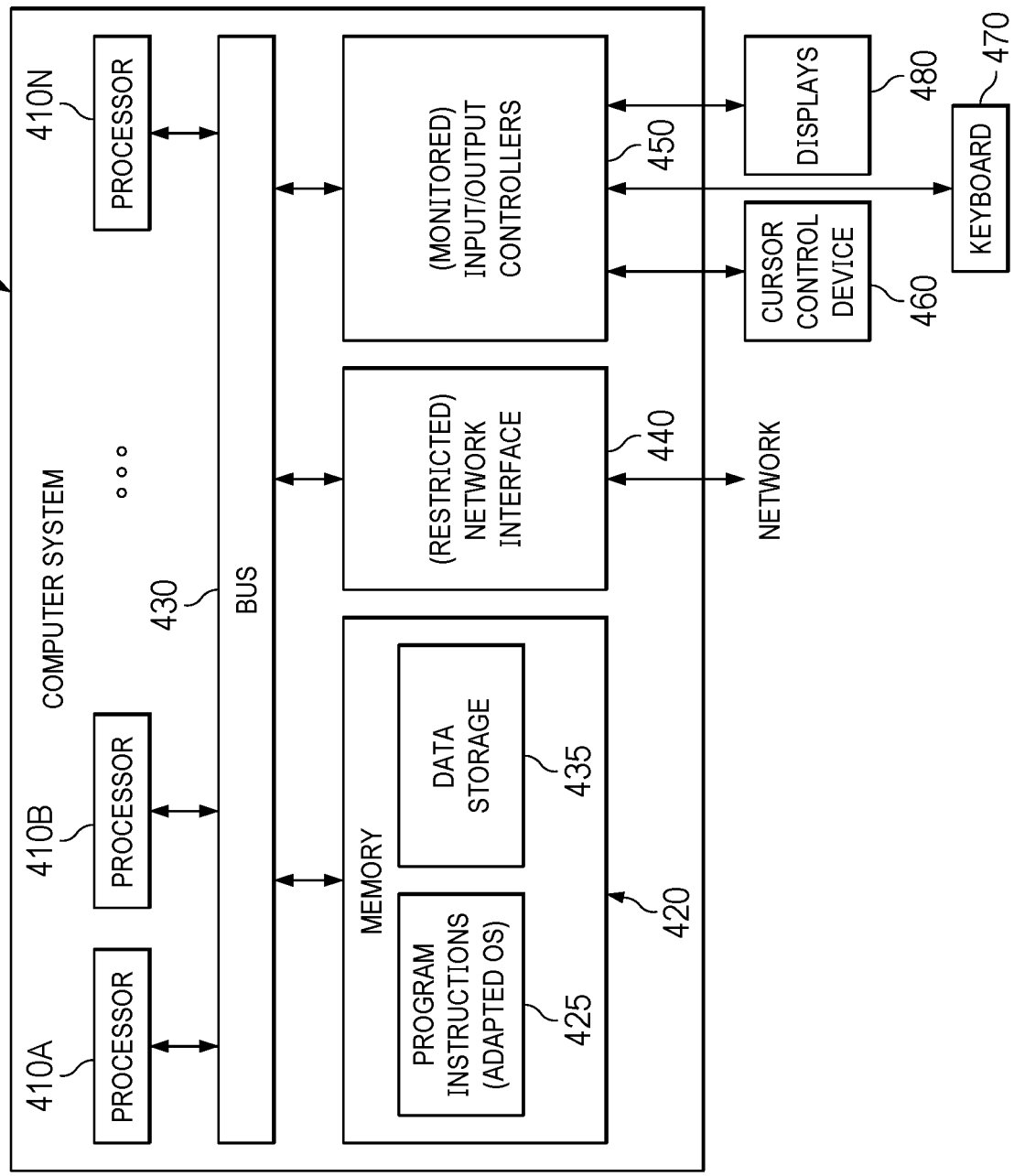

Having thus described the invention in general terms, reference will now be made to the accompanying drawings, which are not necessarily drawn to scale, and wherein:

FIG. 1 is a block diagram of an example correctional environment, wherein an example embodiment of the present post-incarceration digital re-entry platform may be implemented, in accordance with some embodiments;

FIG. 2, a diagrammatic illustration of an example incarcerated individual personal communication and/or media device, according to some embodiments;

FIG. 3 is a flowchart of an example process for post-incarceration digital re-entry process employing the present post-incarceration digital re-entry platform, according to some embodiments; and FIG. 4 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of correctional facilities are present in today's society. Examples of correctional facilities or correctional institutions may include, by way of example, municipal jails, county jails, state prisons, federal prisons, military stockades, juvenile facilities, detention camps, and the like. For convenience of explanation, various examples discussed herein are presented in the context of correctional facilities and their residents may be referred to as incarcerated individuals, arrestees, detainees, or the like.

Embodiments of the present systems and methods are generally directed to correctional facilities, specifically to release of incarcerated individuals from correctional facilities, and particularly to embodiments of a post-incarceration digital re-entry platform, which facilitates returning citizens released from correctional facilities, specifically to release of incarcerated individuals from correctional facilities.

Embodiments of the present post-incarceration digital re-entry platform enables incarcerated individuals to digitally connect with their assigned supervisor at any time. This platform leverages an incarcerated individual personal communication and/or media device, such as a tablet computer adapted for use in a correctional facility, to digitalize pre-release transition to release processes, whereby an incarcerated individual may communicate their needs in order to ease their transition to the outside. In particular, the incarcerated individual gains access (e.g., is granted access, as their release date approaches) to an application program (app) on their incarcerated individual personal communication and/or media device. The incarcerated individual's assigned supervisor has, in accordance with embodiments of the present systems and methods, access to a separate instance of the platform and may manage multiple incarcerated individuals at any given time. The incarcerated individual user, through the platform, identifies their needs and objectives, with respect to their release from the facility. Such "needs" may be immediate needs or future needs, for example they may be in-prison needs or needs once released, such as job-related needs. Additionally, or alternatively, (a) need(s), objective(s), or the like, may also be added by supervisor, as well as a third party interested person or agency, such as a court having jurisdiction over the incarcerated individual or family member. The incarcerated individual's assigned supervisor then assigns, to the incarcerated individual, any tasks that need to be completed in order to achieve that (each) need or objective. A task could be anything from signing a document to completing an educational course to solidify a job post-release. In accordance with embodiments of the present systems and methods, the incarcerated individual is notified, immediately, without needing to wait until a next in-person visit from the incarcerated individual's assigned supervisor. The incarcerated individual can then complete assigned pre-release tasks, which dramatically reduces the amount of effort and expenses on both sides.

In addition to this digital advantage, the present post-incarceration digital re-entry platform will service the incarcerated individual and the assigned supervisor by connecting them with friends and family, outside vendors, education platforms etc. In one example, a justice involved individual user identifies, via the app, that they need a job once they are released. The incarcerated individual's assigned supervisor is notified of the need. However, in this example the incarcerated individual's assigned supervisor may not really know what job would best suit that user. The incarcerated individual's assigned supervisor may be enabled, via the post-incarceration digital re-entry platform to assign a skills assessment task, or the like (which may be provided by an external vendor) to the incarcerated individual. The incarcerated individual may complete the task and, assuming for purposes of this example, the test indicates the incarcerated individual would be good at a particular job, the incarcerated individual's assigned supervisor may use the post-incarceration digital re-entry platform to assign courses to the incarcerated individual that will help educate them in a particular job. This allows the incarcerated individuals to prepare for being released and in turn reduce recidivism. The incarcerated individual can also choose to continue with their education, via the post-incarceration digital re-entry platform, once released from the facility.

The post-incarceration digital re-entry platform will not only serve a user inside a facility, but it will, in accordance with embodiments of the present systems and methods, provide them services outside the facility, post release, as well. In various embodiments, the post-incarceration digital re-entry platform may provide advertisements, access to media purchases (made by an individual while in the correctional facility), personal development services/activities, education, etc.

FIG. 1 is a block diagram of example correctional environment 100, wherein an example embodiment of the present post-incarceration digital re-entry platform may be implemented, in accordance with some embodiments. In environment 100, correctional facility communication processing system 105 may provide telephone services, video-conferencing, online chat, and other communication services to residents of correctional facility 110. In some cases, such as illustrated, correctional facility communication processing system 105 may be co-located with correctional facility 110. Alternatively, or additionally, an external centralized communications processing system may be deployed in a correctional facility vendor (e.g., a correctional facility communications provider) datacenter 115, or the like. That is, correctional facility communication processing system 105 may be centrally and/or remotely located with respect to one or more correctional facilities and/or may provide communication services to multiple correctional facilities, in which case, correctional facility 110 is illustrated as one example. Such a correctional facility vendor datacenter may be connected to such facilities via a public network (e.g., the Internet) or a private network (e.g., intranet) 120, or the like (e.g., via a secure tunneling protocol over the internet, using encapsulation). More generally, however, it should be noted that correctional facility communication system 105 may assume a variety of forms, including a telephony switch, such as an electronic switching system, a telephony server, and/or the like. Correctional facility communication system 105 may be configured to serve a variety of facilities and/or users, whether within or outside of a correctional facility.

Correctional facility vendor datacenter 115 may maintain resident accounts to the benefit of the respective resident, such as resident commissary accounts, resident communications accounts, which may be used to pay for purchase of an incarcerated individual personal communication and/or media device (125) (and accessories, such a headphones, etc.), communications, such as phone calls, media, games, video visitation, internet chats, emails, text messages, or the like.

Residents may use more-or-less conventional telephones 130 to access certain communication services. However, in accordance with embodiments of the present post-incarceration digital re-entry platform, residents may also use an incarcerated individual personal communication and/or media device 125, or the like. For example, personal computer wireless devices, such as a tablet computing devices or smartphones (125), which may have been adapted and/or approved for use in correctional facility, may be used by incarcerated individuals for communication. Such a personal resident device may be referred to as a "incarcerated individual personal communication and/or media device," an "incarcerated individual personal communications and/or media device," an Intelligent Incarcerated Individual Device (IID), or the like, in a correctional institution environment.

Additionally, or alternatively, a resident may use a "communal incarcerated individual communication and/or media terminal" 135, or the like, to place voice calls, as well as for video communication, execution of other apps, including media apps, games, job search apps, etc. Such a correctional facility video communication terminal may be referred to as an Intelligent Facility Device (IFD), which may be a video phone particularly adapted for use in a correctional facility. Generally speaking, multiple incarcerated individual communal communication and/or media terminals/IFDs 135 are disposed in a correctional facility, and may be disposed in a visitation room, in a pod, as part of a kiosk, as an alternative to a correctional facility communication kiosk, etc. As will be appreciated, IID 125, IFD 135, or other similar devices have video conferencing capabilities, or the like, to enable a party to participate in video communication sessions with other call parties, such as non-residents of the correctional facility, via video communication, secure online chat, etc. In some cases, IFD 135 may assume the form of any computer, tablet computer, smart phone, etc., or any other consumer device or appliance with videoconferencing capabilities. For example, in a correctional facility environment a tablet computing device (e.g., an IID 125) may be mounted on a wall, in a hardened case, as an incarcerated individual communal communication and/or media terminal or IFD 135. IFD 135 may also take the form of a docking station adapted to support and interface with an IID 125 to provide communication, data, or other services.

Incarcerated individual personal communication and/or media devices, IIDs 125, may be tablet computing devices, smartphones, media players, smart watches, or the like adapted and/or approved for use by residents of the correctional facility (within the correctional facility). Each IID 125 may be particularly adapted for use in a controlled environment. For example, in a correctional institution, jail, or the like, such an IID, may have a specifically adapted operating system and/or may be "stripped-down," particularly from the standpoint of what apps and/or hardware are provided or allowed on IID 125, and/or connectivity afforded such an IID. For example, such an IID may employ an operating system kernel built for use in such an IID in a correctional facility. As a further example, the IID may be adapted to only connect to a network provided by the correctional facility, and/or in only certain locations, within the correctional facility, such as may be controlled by availability of Wi-Fi access, or the like, only being available in certain areas. That is, for example, where streaming and/or downloading may be compartmentalized, leveraging the (concrete and steel) structure (i.e., construction, layout, etc.) of the correctional facility, for example, limiting the availability of a Wi-Fi signal, providing the stream through the placement of wireless access points, antenna directionality of such wireless access points, and/or the like. Further, the IID may allow access to apps or content only upon application of security measures, by the IID. Such security measures may include determining, by the IID, DNS spoofing, DNS redirection, use of proxy servers for privacy and security, biometric validation, password validation, and/or the like. Also, in accordance with embodiments of the present systems and methods, the IID may have a few fixed apps pre-installed on the device, and installation of further apps on the device may be forbidden (i.e., prevented by modifications to the device's operating system, or the like) and/or restricted, such as by requiring permission from a facility administrator, or the like. Apps provided on IIDs might include apps of particular interest to residents of the correctional facility. For example, IIDs provided to incarcerated individuals of correctional facilities, might include apps that may be of particular use to an incarcerated individual, in general, such as access to a legal research service, or of more specific interest. In accordance with embodiments of the present systems and methods for post-incarceration digital re-entry platform, such as providing an incarcerated individual asynchronous access to a corrections supervisor assigned to the incarcerated individual during incarceration, and when nearing release, such incarcerated individual IIDs may be used to help soon to be released incarcerated individuals transition, as discussed in greater detail below. As such, IIDs may be sponsored, or otherwise subsidized by organizations or companies, assisting with the transition of incarcerated individuals into society, or the like.

Such incarcerated individual personal communication and/or media devices, IIDs, IFDs, incarcerated individual personal communications and/or media devices (generally, 125 and 135), or the like, may have apps installed thereon for access by an incarcerated individual-user. Such apps may include, in accordance with embodiments of the present post-incarceration digital re-entry platform, a post-incarceration re-entry app, as well as a incarcerated individual calling application, a video visitation application, a incarcerated individual's manual, a incarcerated individual form submittal program, an incarcerated individual commissary ordering application, a music player, a video player, a web browser, a document reading program, an email application, Prison Rape Elimination Act information document, Prison Rape Elimination Act hotline, a legal research application, a job search application, an incarcerated individual grievance submittal application, a sick call app, education app, weather app, video mail, resident information app, one or more games, and/or the like.

In various embodiments, to access communication services, a resident may initiate approved telephone services by lifting the receiver on telephone 130 or IFD 135, and/or otherwise initiating a call, such as by launching a communications app on IID 125 (or IFD 135). At which time, the resident may be prompted to provide a personal identification number (PIN), other identifying information and/or biometrics. An Interactive Voice Response (IVR) unit (not shown, but which may be integrated into correctional facility communication processing system 105) may generate and play a prompt, or other messages, to the resident on device 125, 130 or 135. Likewise, to securely access some aps, such as the present post-incarceration re-entry app on IID 125, an incarcerated individual may also provide the same or different PIN in each system, other identifying information, biometrics, and/or the like.

Under the control of correctional facility communication processing system 105, devices 125, 130 or 135 may be capable of connecting to a non-resident's (i.e., a person not incarcerated in a correctional facility) telephone 140 across a Publicly Switched Telephone Network (PSTN) 145. For example, telephone, cell phone or smart device 140 may be located at a non-resident's home or office, at a resident visitation center, etc. Telephony switch 150, in correctional facility communication processing system 105, may be used to connect calls across PSTN 145. Additionally, or alternatively, the non-resident may communicate using device 155, which may be a mobile phone, tablet computing device, personal computer, or the like, which may be connected through an Integrated Services Digital Network (ISDN), Voice-over-IP (VOIP), or packet data network (such as, for example the Internet), a wireless communications network, or the like 120. Telephony router 160 of correctional facility communication processing system 105 is used to route data packets associated with a call connection to device 155. Communications between an incarcerated individual and non-residents may include voice, text, and/or video, which may be in the form of email, instant messaging, or the like. For example, a non-resident party may have a device 155 with a built-in front-facing camera, or the like, and an integrated display (e.g., a smart phone, tablet, etc., as illustrated), a personal computer with a webcam, etc. A network connection between the parties may be established and supported by an organization or commercial service that provides computer services and software for use in telecommunications and/or VOIP, such as SKYPE®. Additionally, or alternatively, the correctional facility and/or the destination may use videoconferencing equipment compatible with ITU H.323, H.320, H.264, and/or V.80, or other suitable standards.

Centralized investigative data aggregation and analysis system 165 may be a platform for providing investigative tools in communication, such as via public network 120, with correctional facility 110, namely correctional facility communication processing system 105, and/or the like. Such investigative tools may provide collection, processing, analysis, and/or reporting of information for intelligence purposes. In some embodiments, the investigative tools may provide functions such as entity linkage analysis, communication statistics, organization analysis, communication behavior analysis, subscription usage analysis, app usage analysis, common communication analysis, timelines, correlations, mapping, word search, language translation (whether machine translation or access to translation services), call recording (whether terminated external to the correctional facility or internally thereto), call notification, call monitoring (whether real-time or recorded, and whether monitoring a particular call or a plurality of calls), call "barging," call control, visitation monitoring/background checking, crime tip conduit, account activity monitoring (whether tracing deposits and expenditures of monies or monitoring account trends and behavior, such as velocity of transactions), multiple database querying, and resource integration, and/or the like. One or more of these investigative tools may be provided through an intuitive user interface to provide ease of use, facilitate operation across a variety of user terminals, and/or to facilitate remote access to one or more features thereof. For example, in some cases, a web-based portal enabling individuals to store and transmit information, including forensic tools that analyze communications into and out of correctional facilities to assist law enforcement may be provided. Such a web page portal may have menus comprising an investigator dashboard, to present and facilitate execution of various investigative operations. These investigative tools may log calls (e.g., as Call Detail Records (CDRs)), so that an investigator may research them through an archive and may be provided access to internal and/or external criminal databases and/or other sources of useful information. Centralized investigative data aggregation and analysis system 165 may, in accordance with embodiments of the present systems and methods, provide collection, processing, analysis, and/or reporting of app usage analysis, for intelligence purposes. Such app usage analysis may be based on for example, frequency, length of use, time of day of use, pattern of use, and/or the like, for one or more (various (particular)) apps, two or more incarcerated individuals being presented with similar app display based usage, etc. Other criteria that may influence whether to analyze app usage may include time remaining for the incarcerated individual to reside in the facility, a classification of the incarcerated individual with respect to the facility, offence(s) an incarcerated individual has been convicted of and/or is incarcerated for, and/or the like.

In addition to providing certain visitation and communication operations, correctional facility communication processing system 105 may ensure that an incarcerated individual's calls, video conferences, online chats, etc. are performed only with non-residents whose identities, devices, email addresses, phone numbers, etc. are listed in that resident's Pre-Approved Contact (PAC) and/or Pre-Approved Number (PAN) list. Each resident's PAC and/or PAN list(s) may be stored, for example, in (a) database(s) maintained by correctional facility vendor datacenter 115, centralized investigative data aggregation and analysis system 165, and/or the like. In addition to PAC and/or PAN list(s), correctional facility vendor datacenter 115, centralized investigative data aggregation and analysis system 165, and/or the like, may also store Resident Profile Data (RPD), as well as communication and/or visitation rules applicable to each resident. This correctional facility vendor datacenter 115 and/or centralized investigative data aggregation and analysis system 165 database(s) may include information such as balances for resident trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. In some implementations, correctional facility communication processing system 105 may be configured to perform communication monitoring operations, such as being configured to monitor and or record communication sessions (e.g., as electronic video files). Also, in accordance with some embodiments, correctional facility vendor datacenter 115, centralized investigative data aggregation and analysis system 165, and/or the like, may maintain information about app usage by each incarcerated individual.

Post-incarceration re-entry server 170, in conjunction with, and/or through the use of, post-incarceration re-entry app running on incarcerated individual personal communication and/or media device 125, may provide the present post-incarceration digital re-entry platform, in accordance with embodiments of the present systems and methods. Post-incarceration re-entry server 170 may be a separate system, or may be a part or function of correctional facility vendor datacenter 115, as illustrated, may be a part or function of correctional facility communication processing system 105, and/or may be a part or function of a standalone system within or outside correctional facility 110. Post-incarceration re-entry server 170 may be configured to establish asynchronous communication between an incarcerated individual and a correctional facility assigned supervisor of the incarcerated individual for successful re-entry counseling support. As used herein, "asynchronous communications" include communications that are not "face-to face," or particularly, not at the same time. This may include granting, via incarcerated individual personal communication and/or media device 125, the incarcerated individual access to a (first instance of a) post-incarceration re-entry app on the incarcerated individual personal communication and/or media device and enabling access by the correctional facility assigned supervisor of the incarcerated individual (assigned by the post-incarceration digital re-entry platform itself, by an administrator, or by an individual with administrator rights) to the post-incarceration digital re-entry platform (such as through a second instance of the post-incarceration re-entry app).

Under the post-incarceration digital re-entry platform, incarcerated individual personal communication and/or media device 170, which is, as noted, restricted for use in a correctional facility, may provide, via the post-incarceration re-entry app, an interface to accept from the incarcerated individual identification of one or more needs and/or one or more objectives related to release of the incarcerated individual from the correctional facility, or the like. For example, the incarcerated individual may benefit from assistance with housing, substance abuse treatment, access to employment opportunities, mental health treatment, medication, virtual healthcare, government benefits, childcare, a family reintegration plan, parenting classes, transportation, education classes, access to clothing resources, access to interview building resources, financial counseling, life skill building resources, or any second chance programs available. In accordance with some embodiments, (a) need(s), objective(s), or the like, may also be added by the assigned supervisor or a third party or agency with a vested interest in the incarcerated individual, such as a court having jurisdiction over the incarcerated individual, family member, child protective services, court counselor psychologist, psychiatrist, school, trainer, potential employer, or the like. Input of such needs or objectives by the assigned supervisor or third-party with a vested interest may be made to the post-incarceration digital re-entry platform, such as to post-incarceration re-entry server 170, via web interface or the like, via which identification of the third party may also be verified.

Post-incarceration re-entry server 170 may further maintain the asynchronous communication between the incarcerated individual and the correctional facility assigned supervisor of the incarcerated individual for successful re-entry counseling. In various embodiments, this may include presenting the one or more needs and/or one or more objectives identified by the incarcerated individual, supervisor assigned to the incarcerated individual, and/or an entity with a vested interest in the success of the incarcerated individual, via post-incarceration re-entry server 170. In accordance with some embodiments of the present systems and methods, any entity with a vested interest in the incarcerated individuals post re-entry success, such as a court with jurisdiction over the incarcerated individual, family member, or the like, may provide objectives or requirements for the incarcerated individual prior to release. Post-incarceration re-entry server 170 may also accept assignment, by the correctional facility assigned supervisor of the incarcerated individual, one or more tasks to be completed by the incarcerated individual to achieve each of the need(s) and/or objective(s) identified by the incarcerated individual, or the supervisor assigned.

Post-incarceration re-entry server 170 may also notify the incarcerated individual, via the post-incarceration re-entry app on incarcerated individual personal communication and/or media device 125, of the one or more tasks to be completed by the incarcerated individual to achieve each of the need(s), objectives(s), requirement(s) and/or the like. Further, post-incarceration re-entry server 170, or the like, may notify a third party with a vested interest in the incarcerated individual of the one or more tasks to be completed by the incarcerated individual to achieve each of the one or more needs and/or one or more objectives.

In order to facilitate aspects of embodiments of the present systems and methods, such as completion of assigned tasks by the incarcerated individual, outside organizations 175 that provides educational, job opportunities, housing opportunities, or other services to soon to be released incarcerated individuals may, in accordance with some embodiments, be allowed to communicate with incarcerated individuals without being required to establish a communications account with the correctional facility or correctional facility communications provider. However, the communications between an outside organization and an incarcerated individual may still be monitored, such as by correctional facility communication processing system 105 and/or centralized investigative data aggregation and analysis system 165, as described above.

Further, post-incarceration re-entry server 170 may track and/or accept input from the incarcerated individual, via the post-incarceration re-entry app, that indicates progress in completing and/or completion of each of the one or more tasks by the incarcerated individual. Additionally, post-incarceration re-entry server 170 may report such completion of, and/or the progress in completing, each of the one or more tasks by the incarcerated individual, to the correctional facility assigned supervisor of the incarcerated individual. As noted, in accordance with some embodiments, (a) need(s), objective(s), or the like, may also be added by a third party or agency with a vested interest such as a court having jurisdiction over the incarcerated individual, family member, etc. In furtherance of such embodiments, post-incarceration re-entry server 170 may report completion, and/or progress, to the interested third party. For example, is a situation where a court has mandated that an incarcerated individual completes a program, post-incarceration re-entry server 170 may report completion, and/or progress, to the court.

post-incarceration re-entry server 170 may employ machine learning to perform a risk and needs assessment to address causes of incarceration of the incarcerated individual, employ machine learning to suggest (e.g., develop suggestions of) programs, plans and (outside) organizations 175, drawn from a catalog of available programs, plans and organizations, that address at least the needs identified by the assessment, and/or the need(s), objectives(s), and/or the like, identified by the incarcerated individual, the supervisor, or other entity with a vested interest in the success of the incarcerated individual. Post-incarceration re-entry server 170 may then present the suggested available programs, plans and organizations to address at least the needs identified by the assessment, and/or the need(s), objectives(s), and/or the like, identified, to the correctional facility assigned supervisor of the incarcerated individual. These suggested available programs, plans and organizations may be presented as one or more tasks to be completed by the incarcerated individual, or assigned to the incarcerated individual, as described above.

Additionally, or alternatively, as the incarcerated individual nears release from the correctional facility, post-incarceration re-entry server 170 may employ machine learning to develop a needs and goals action plan to address the need(s), objectives(s), and/or the like, identified by the incarcerated individual or the supervisor assigned and employ machine learning to suggest, from the same, or from a different, catalog, available programs, plans and organizations, to fulfill the action plan, and thereby address the need(s), objectives(s), and/or the like, identified by the incarcerated individual or the assigned supervisor. Post-incarceration re-entry server 170 may then present suggested available programs, plans and organizations to fulfill the action plan to the correctional facility assigned supervisor of the incarcerated individual, as one or more tasks to be completed by the incarcerated individual, and thereby address the need(s), objectives(s), and/or the like, identified by the either incarcerated individual or the assigned supervisor.

Post-incarceration re-entry server 170 may also employ machine learning to rank and prioritize the above-discussed suggestions from the catalog of available programs, plans and organizations, based, at least in part on a record of outcomes, which may, in turn, be based at least in part on prior results, for presentation to the supervisor assigned to the incarcerated individual, as one or more tasks to be completed by the incarcerated individual.

The forgoing application of machine learning provides the correctional facility assigned supervisor of the incarcerated individual recommendations that he cannot, from a practical standpoint, achieve himself. That is, this use of machine learning to perform a risk and needs assessment, develop a needs and goals action plan, to suggest (e.g., develop suggestions) from the catalog of available programs, plans and organizations that address the need(s) identified by the assessment, and/or the need(s), objectives(s), and/or the like, identified by the incarcerated individual, the needs identified by the correctional supervisor and/or the like, aggregate all of such information in a manner that the correctional facility assigned supervisor cannot, alone.

To such ends, post-incarceration re-entry server 170, or the like, may host, develop and use databases, in which tables may include, by way of example, self-referential tables of provider outcomes, so as to provide a self-referential database. Therein, all entity types providing a particular service can be stored in a single table and the table rows can contain information defining the table columns, resulting in (eventually, deeply) nested hierarchies of service provider outcomes for each specific incarcerated individual need or objective. Such self-referencing databases and tables provide significant advantages and benefits over conventional databases, such as increased flexibility, faster search times, and smaller memory requirements. Further, such self-referential databases and tables may be developed using, and/or may be used by, machine learning to provide a depth to incarcerated individual need and/or objective research that results in significantly improved post-incarceration re-entry outcomes related to such incarcerated individual needs and objectives. That is machine learning may not only enable implementation of self-referencing databases and tables to create deeply nested hierarchies of service provider outcomes for each specific incarcerated individual need or objective, but also provide a mechanism to explore such nested hierarchies of service provider outcomes for each specific incarcerated individual need or objective to derive courses, tasks, etc. to facilitate achievement of the need or objective by the incarcerated individual.

For example, in embodiments of the present systems and methods, databases may include name, location, facility, age, date of birth, inmate number, previous facilities, future facility, criminal history, medical history, support network, relatives, mentors, interests, skills, education, hearings, meetings with case workers, program requirements, digital purchases, currency availability, and/or the like. In an example implementation, an incarcerated individual may be assigned a self-assessment test to figure out the best job that the incarcerated individual is suited for. Based on the answers post-incarceration re-entry server 170, or the like, could identify a good fit. Once the post-incarceration re-entry server 170, or the like determines the job, it could determine what the training or certificates required would be. Once the incarcerated individual completes the certificates and training the post-incarceration re-entry server 170, or the like, may take information into account such as the location of the person and their specific talents and it may suggest all open positions in that area both physically and best suited and the computer would suggest good fits based on all of the incarcerated individuals.

As noted, in various embodiments, aspects of systems and methods described herein may be implemented, at least in part, using machine learning (ML). As used herein, the terms "machine learning" or "ML" refer to one or more algorithms that implement: a neural network (e.g., artificial neural network, deep neural network, convolutional neural network, recurrent neural network, autoencoders, reinforcement learning, etc.), fuzzy logic, artificial intelligence (AI), deep learning, deep structured learning, hierarchical learning, support vector machine (SVM) (e.g., linear SVM, nonlinear SVM, SVM regression, etc.), decision tree learning (e.g., classification and regression tree or "CART"), Very Fast Decision Tree (VFDT), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), or the like.

Non-limiting examples of publicly available machine learning algorithms, software, and libraries that may be utilized within embodiments of systems and methods described herein include, but are not limited to: PYTHON, OPENCV, INCEPTION, THEANO, TORCH, PYTORCH, PYLEARN2, NUMPY, BLOCKS, TENSORFLOW, MXNET, CAFFE, LASAGNE, KERAS, CHAINER, MATLAB Deep Learning, CNTK, MatConvNet (a MATLAB toolbox implementing convolutional neural networks for computer vision applications), DeepLearnToolbox (a Matlab toolbox for Deep Learning from Rasmus Berg Palm), BigDL, Cuda-Convnet (a fast C++/CUDA implementation of convolutional or feed-forward neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPOT, ConvNet, ELEKTRONN, OpenNN, NEURALDESIGNER, Theano Generalized Hebbian Learning, Apache SINGA, Lightnet, and SimpleDNN.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

In accordance with embodiments of the present systems and methods, a correctional communication and/or media device, IID 125, or IFD 135, may, as discussed in greater detail below, employ at least one processor and a memory coupled to the processor(s). This memory may, for example, be configured to store program instructions executable by the processor(s). These program instructions may include an operating system for incarcerated individual personal communication and/or media device 125, and an incarcerated individual-user interface program or application that includes program instructions executable by the processor(s). This incarcerated individual-user interface may run on top of, and/or as part of, the operating system. The incarcerated individual-user interface may request and accept identification information (e.g., a resident/incarcerated individual ID number, biometrics, or the like and a PIN, or the like) from an incarcerated individual operating incarcerated individual personal communication and/or media device 125. Incarcerated individual personal communication and/or media device 125, such as in some embodiments in conjunction with correctional facility communication processing system 105, post-incarceration re-entry server 170, and/or the like, verifies the identification information. The incarcerated individual-user interface may then present apps available for use by the resident/incarcerated individual-user of incarcerated individual personal communication and/or media device 125.

Turning now to FIG. 2, a diagrammatic illustration of example incarcerated individual personal communication and/or media device 200, according to some embodiments, example interface 205 of a post-incarceration re-entry app is shown. An IID (125) is illustrated in FIG. 2 as incarcerated individual personal communication and/or media device 200. However, similar functionality may be provided by an IFD (135), or the like, in accordance with embodiments of the present systems and methods, but will be described herein with reference to incarcerated individual personal communication and/or media device 200.

As noted above, incarcerated individual-user interface 210 may run on top of, and/or as part of, an operating system of incarcerated individual personal communication and/or media device 200. Incarcerated individual-user interface 210 may request and accept identification information (e.g., a resident/incarcerated individual ID number, biometrics or the like and a PIN, or the like) from an incarcerated individual operating incarcerated individual personal communication and/or media device 200. Additionally, or alternatively, post-incarceration re-entry app interface 205 may request and accept the same, or other, identification information. Incarcerated individual personal communication and/or media device 200 may, verify such identification information, such as in conjunction with a correctional facility communication processing system (105) and/or a post-incarceration re-entry server (170). Incarcerated individual-user interface 210 may, such as following verification of the user's identification information, present, on screen 215 of incarcerated individual personal communication and/or media device 200, icons for (launching) apps available for use by the resident/incarcerated individual-user of incarcerated individual personal communication and/or media device 200, such as, by way of example, the present post-incarceration re-entry app.

Also, in accordance with various embodiments of the present systems and methods, incarcerated individual personal communication and/or media device 125 (and hence, incarcerated individual personal communication and/or media device 200) may, automatically store app login information associated with the incarcerated individual-user for each app. In such embodiments, the resident-user may be automatically logged into a selected app, such as, by way of example, the present post-incarceration re-entry app, using the stored app login information for the selected app upon selection of icon 205 for the selected app. However, in some embodiments, incarcerated individual personal communication and/or media device 125 (or 200) may again request and accept identification information from the resident upon selection of an icon (205). In such embodiments, automatically logging the resident-user into the selected app may further entail verifying this (new) identification information (in conjunction with correctional facility communication processing system 105 and/or post-incarceration re-entry server 170, with respect to the present post-incarceration re-entry app), and then automatically logging the resident-user into the selected app using the stored app login information in response to verifying the identification information.

Post-incarceration re-entry app interface 205 may provide a communications interface to facilitate the above-discussed asynchronous comminutions between the incarcerated individual and the incarcerated individual's assigned supervisor, such as by providing not only face-to-face synchronized video and/or text, but also asynchronous video and/or text. Post-incarceration re-entry app 205 may also present need and/or objective selection option(s) 220 leading to (a) screen(s) in which the incarcerated individual user may select or enter specific (post-release) needs and/or objectives. Post-incarceration re-entry app 205 may provide further various interfaces, and/or access to interfaces for completion of assigned tasks, and incarcerated individual reporting of process or completion of assigned tasks. For example, post-incarceration re-entry app 205 may provide an ability to browse available courses or trainings, with filtering that might be by subject matter, industry, location or any properties that match up with the incarcerated individual's qualifications. The app and or post-incarceration digital re-entry platform may synchronize scheduling of such courses or trainings with the incarcerated individual's calendar of upcoming due dates and proactive reminders. Likewise, if a due date, or the like is missed by the incarcerated individual there could be a notification to the supervisor by the post-incarceration re-entry app 205, and/or (through) the post-incarceration digital re-entry platform.

Some embodiments of the present systems and methods may provide a reward system. Wherein, if the incarcerated individual completes all of their tasks or objectives they may earn rewards, which may be displayed and redeemed via post-incarceration re-entry app 205, for secure products.

FIG. 3 is a flowchart of example process 300 for post-incarceration digital re-entry process 300 employing the present post-incarceration digital re-entry platform, according to some embodiments. Therein, at 305, asynchronous communication between an incarcerated individual and a correctional facility assigned supervisor of the incarcerated individual for re-entry counseling may be established, at 310, granting, via an incarcerated individual personal communication and/or media device (125) adapted for use in an correctional facility (110), an incarcerated individual access to (a first instance of) a post-incarceration re-entry app (205) on the incarcerated individual personal communication and/or media device. This establishment of asynchronous communication between the incarcerated individual and the correctional facility assigned supervisor may also entail enabling, by the post-incarceration re-entry server (170), access by the correctional facility assigned supervisor of the incarcerated individual to the post-incarceration digital re-entry platform (e.g., access to a second instance of the post-incarceration re-entry app, or a similar interface), such as a web-based interface, at 315. Such access at 310 and 315 may include the post-incarceration re-entry app and the post-incarceration digital re-entry platform providing, and/or otherwise presenting, communication interfaces enabling the incarcerated individual and correctional facility assigned supervisor of the incarcerated individual to communicate with one another, in an asynchronous manner (i.e., not necessarily face-to face, or even at the same time). Such communication interfaces may include (a) text, voice, and/or video communication(s) interface(s), and/or the like.

In accordance with embodiments of the present systems and methods, the incarcerated individual may be assigned to the supervisor by the post-incarceration re-entry server, or the like. For example, the post-incarceration re-entry server, or the like, may determine that a release date for release of the incarcerated individual from the correctional facility is within a time threshold, and the incarcerated individual may be assigned to the supervisor in response to such a determination that the release date for the incarcerated individual is within the time threshold. The correctional facility may assign the supervisor to a plurality of incarcerated individuals. Further, granting the incarcerated individual access to the post-incarceration re-entry app at 305 may include the post-incarceration re-entry server, or the like, sending a message or a notification to the incarcerated individual, on the incarcerated individual personal communication and/or media device, granting the access to the post-incarceration re-entry app. Such a message or notification may be sent in response to a determination, by the post-incarceration re-entry server, or the like, that the release date for the incarcerated individual is within the time threshold.

At 320, the asynchronous communication between the incarcerated individual and the correctional facility assigned supervisor may be maintained, such as, by, at 325 providing, via the post-incarceration re-entry app, an interface to accept from the incarcerated individual identification of one or more needs and/or one or more objectives of the incarcerated individual, such as may be related to release of the incarcerated individual from the correctional facility. Such needs and objectives may be something that the incarcerated individual is looking to complete while in the correctional facility or once released, such as a certificate or training for employment. Other examples of incarcerated individual needs or objectives could be housing upon release, parenting classes, Alcoholics Anonymous meeting attendance, etc.

Also, to facilitate maintaining the asynchronous communication between the incarcerated individual and the correctional facility assigned supervisor, the post-incarceration digital re-entry platform (server) may, at 330, present the need(s) and/or objective(s) identified by the incarcerated individual to the correctional facility assigned supervisor, such as via the post-incarceration digital re-entry platform.

In accordance with some embodiments, (a) need(s), objective(s), or the like, may also be added by the assigned supervisor or a third party or agency with a vested interest in the incarcerated individual, such as a court having jurisdiction over the incarcerated individual, family member, child protective services, court counselor psychologist, psychiatrist, school, trainer, potential employer, or the like. Input of such needs or objectives by the assigned supervisor or third-party with a vested interest may be made to the post-incarceration digital re-entry platform, such as to the post-incarceration re-entry server (170), via web interface or the like, via which identification of the third party may also be verified.

Alternatively, or additionally, at 335, the post-incarceration re-entry server, or the like, may employ, or otherwise use, machine learning to perform a risk and needs assessment to address causes of incarceration of the incarcerated individual. Further, or alternatively, at 335, the post-incarceration re-entry server, or the like, may employ, or otherwise use, machine learning to develop a needs and goals action plan to address the need(s), objectives(s), and/or the like, identified by the incarcerated individual or the assigned supervisor. In such embodiments, or otherwise separately, the post-incarceration re-entry server may, at 340, employ, or otherwise use, machine learning to suggest programs, plans, organizations, and/or the like, drawn from a catalog of available programs, plans, organizations, and/or the like, to address or fulfill the needs identified by the assessment(s), the action plan developed by the assessment(s), the needs or objectives identified by the incarcerated individual or assigned supervisor, and/or the like. Additionally, the post-incarceration re-entry server, or the like, may, at 345, employ, or otherwise use, machine learning, to rank and/or prioritize the suggestions drawn from the catalog of available programs, plans, organizations, and/or the like, based, at least in part, on a record of outcomes, which may be based at least in part on prior results, and/or the like. At 350, the (ranked and/or prioritized) suggested available programs, plans, organizations, and/or the like to address or fulfill the needs identified by the assessment(s), the action plan developed by the assessment(s), the needs or objectives identified by the incarcerated individual or assigned supervisor, and/or or the like, at least the needs identified by the assessment may be presented to the correctional facility assigned supervisor of the incarcerated individual, by the post-incarceration re-entry server, or the like, as one or more tasks to be completed by the incarcerated individual.

At 355, such as to maintain the asynchronous communication between the incarcerated individual and the correctional facility assigned supervisor at 320, the post-incarceration digital re-entry platform (server) may accept, assignment, by the correctional facility assigned supervisor, to the incarcerated individual, of one or more tasks to be completed by the incarcerated individual to achieve each of the need(s) and/or objective(s) identified by the incarcerated individual or assigned supervisor, from 325, above.

To further maintain asynchronous communication 320 between the incarcerated individual and the correctional facility assigned supervisor the post-incarceration digital re-entry platform may notify, via the post-incarceration re-entry app, on the incarcerated individual personal communication and/or media device, the incarcerated individual at 360 of the one or more tasks to be completed by the incarcerated individual to achieve each of the need(s), objectives(s), and/or the like. To such ends, the post-incarceration re-entry app, may present, via the incarcerated individual personal communication and/or media device, an interface for the incarcerated individual to access one or more education platforms, job platforms, housing platforms, and/or the like, each such platform providing (a) respective educational program, job opportunit(y)(ies) housing opportunit(y)(ies), and/or the like, identified in the task(s) to be completed by the incarcerated individual. Likewise, the post-incarceration re-entry app, may present, via the incarcerated individual personal communication and/or media device, an interface for the incarcerated individual to access one or more vendors, or the like, outside the correctional facility. Each of these vendors, or the like, may be associated with one or more of the one or more tasks to be completed by the incarcerated individual. Further, the post-incarceration re-entry server (170), or the like, may notify a third party with a vested interest in the incarcerated individual of the one or more tasks to be completed by the incarcerated individual to achieve each of the one or more needs and/or one or more objectives.

At 365, the post-incarceration digital re-entry platform, may track and/or accept, via the post-incarceration re-entry app, input from the incarcerated individual indicating progress in completing, and/or completion of, (each of) the task(s) assigned by the correctional supervisor at 355, so as to further maintain asynchronous communication 320 between the incarcerated individual and the correctional facility assigned supervisor. Whereupon, at 370, the post-incarceration digital re-entry platform may report, to the correctional facility assigned supervisor of the incarcerated individual, the completion of, and/or the progress in completing, each of the one or more tasks by the incarcerated individual, to also further maintain asynchronous communication 320 between the incarcerated individual and the correctional facility assigned supervisor. Further, the post-incarceration re-entry server (170), or the like, may report to a third party with a vested interest in the incarcerated individual completion of, and/or progress in completing, each of the one or more tasks by the incarcerated individual.

In accordance with some embodiments of the present systems and methods, the post-incarceration re-entry app, may also present, via the incarcerated individual personal communication and/or media device, advertisements, access to buy media content for use on the incarcerated individual personal communication and/or media device, access to personal development services and/or activities via the incarcerated individual personal communication and/or media device, access to educational services, via the incarcerated individual personal communication and/or media device, and/or other such advertisements or access to purchases.

Following release of the incarcerated individual from the correctional facility, the interface accessing one or more education platforms, job platforms, housing platforms, and/or the like, discussed above, may be presented to the formerly incarcerated individual, such as via a post-release app, web page, other web-based interface, and/or the like. The formerly incarcerated individual may have access to any media that they purchased, and communications saved (video communication with family, training programs, etc.), post release. Once an individual is released their access may be more open and less restrictive. They may have the ability to access more features. One such feature may be location services. Additional apps may also be available outside of the facility. An example of an app that may be available outside of the facility may be one or more ride-share apps. Those apps would be beneficial as they may assist the post released individual in transportation to potential employment. Through the post-incarceration re-entry app, the post releasee may be able to get sponsored rides to jobs and home but only to such places, for example. Also, if a certification for a job is about to expire, the post-incarceration re-entry app may provide another certification opportunity. The post-incarceration re-entry app may contain a chat/video function with a parole officer, or the like. There may also be a staff member that may be able to assist with applying for a job or finding a doctor or any vendor assistance that may be available. If a vendor is no longer available or meeting the released individual's needs, the post-incarceration re-entry app may suggest a different, better suited vendor. For example, if the post release person's lease expires, the post-incarceration re-entry app may be able to suggest another housing option.

Additionally, upon release, the post-incarceration re-entry system may transfer from the supervisor to a new parole officer, or the like. There may be notes from a parole officer. These notes may go back into the AI to rate success of the program. The system could track the success rate of the program as well as the supervisors. Report could include keystrokes and time spent on the program/training time, effectiveness of courses/vendors, and/or the like. The post-incarceration re-entry app may also have a field for the post release individual to give feedback to improve the program.

Various elements of the present post-incarceration digital re-entry systems and methods may be implemented as modules. Modules may be implemented in hardware. In another embodiment, modules may be expressed in software executed by hardware. In still another embodiment, modules may be implemented in firmware operated by hardware. In still other embodiments, modules may be implemented in combinations of hardware, software, and/or firmware. Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Thus, embodiments of the present post-incarceration digital re-entry systems and methods, as described herein, may be implemented at least in part as, or executed, at least in part, by one or more computer systems. One such computer system is illustrated in FIG. 4. In various embodiments, computer 400 may implement one or more steps of example process 300 described above with respect to FIG. 3, and/or a computer system such as computer system 400 may be used as part of, one or more of: correctional facility communication system 105; centralized investigative data aggregation and analysis system 165; incarcerated individual communications devices 125; IFD 135; non-resident communications devices 155; and/or the like. In various embodiments two or more of these computer systems may be configured to communicate with each other in any suitable way, such as, for example, via public network 120, which may be the Internet, or the like, as discussed above, via a local area network using wired or wireless functionality, etc.

As illustrated, computer system 400 includes one or more processors 410A-N coupled to a system memory 420 via bus 430. Computer system 400 further includes a network interface 440 coupled to bus 430, and one or more I/O controllers 450, which in turn are coupled to peripheral devices such as cursor control device 460, keyboard 470, (touch screen or hologram) display(s) 480, etc. Each of I/O devices 460, 470, 480 may be capable of communicating with I/O controllers 450, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 400 may be a single-processor system including one processor 410A, or a multi-processor system including two or more processors 410A-N (e.g., two, four, eight, or another suitable number). Processors 410 may be any processor capable of executing program instructions. For example, in various embodiments, processors 410 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 410 may commonly, but not necessarily, implement the same ISA. Also, in some embodiments, at least one processor 410 may be a graphics processing unit (GPU) or another dedicated graphics-rendering device.

System memory 420 may be configured to store program instructions and/or data accessible by processor 410. In various embodiments, system memory 420 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 420 as program instructions 425 and data storage 435, respectively. Program instructions 425 may, in an IID (125) may include a specifically adapted operating system, which may particularly configure the IID to use in a correctional facility, by an incarcerated individual. In some embodiments, (other) program instructions and/or data may be received, sent, or stored upon different types of computer-accessible media or on similar media separate from system memory 420 or computer system 400.

A computer-accessible medium may include any tangible and/or non-transitory storage media or memory media such as electronic, magnetic, or optical media—e.g., disk or CD/DVD-ROM coupled to computer system 400 via bus 430. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 430 may be configured to coordinate I/O traffic between processor 410, system memory 420, and any peripheral devices in the computer system, including network interface 440 or other peripheral interfaces, such as I/O devices 460, 470, 480. In some embodiments, bus 430 may perform any necessary protocol, timing, or other data transformations to convert data signals from one component (e.g., system memory 420) into a format suitable for use by another component (e.g., processor 410). In some embodiments, bus 430 may include support for devices attached through various types of peripheral buses, such as a variant of the Peripheral Component Interconnect (PCI) bus standard or the Universal Serial Bus (USB) standard, for example. In some embodiments, the function of bus 430 may be split into two or more separate components, such as a northbridge chipset and a southbridge chipset, for example. In addition, in some embodiments some or all the functionality of bus 430, such as an interface to system memory 420, may be incorporated directly into processor(s) 410A-N.

Network interface 440 may be configured to allow data to be exchanged between computer system 400 and other devices attached to a network, such as other computer systems, or between nodes of computer system 400. As parenthetically indicated, and discussed, above an IID (125) may be restricted to only connect to a particular network provided by the correctional facility, and/or in only particular locations, within the correctional facility. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 450 may, in some embodiments, enable communications with one or more display terminals, keyboards, keypads, touchpads, touch screens, scanning devices, voice or optical recognition devices, mobile devices, or any other devices suitable for entering or retrieving data by one or more computer system 400. Multiple I/O controllers 450 may be present in computer system 400 or may be distributed on various nodes of computer system 400. In some embodiments, I/O devices may be separate from computer system 400 and may interact with one or more nodes of computer system 400 through a wired or wireless connection, such as over network interface 440. Consistent with the discussion above, input and output to an IID (125), or the like, may be monitored.

As shown in FIG. 4, system memory 420 may include program instructions 425, configured to implement certain embodiments described herein, and data storage 435, comprising various data may be accessible by program instructions 425. In an embodiment, program instructions 425 may include software elements, which may be configured to affect the operations discussed in FIGS. 1 through 3. Program instructions 425 may be implemented in various embodiments using any desired programming language, scripting language, or combination of programming languages and/or scripting languages (e.g., C, C++, C #, JAVA®, JAVASCRIPT®, PERL®, etc.). Data storage 435 may include data that may be used in these embodiments (e.g., recorded communications, profiles for different modes of operations, etc.). In other embodiments, other or different software elements and data may be included.

A person of ordinary skill in the art will appreciate that computer system 400 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

For example, since computer-based environment components of embodiments of the present systems and methods may include programing and/or hardware to implement such embodiments, this programming may take the form of stored program instructions, programed firmware, or the like, while hardware might take the form of an Application Specific Integrated Circuit (ASIC), or the like, to carry out such aspects of embodiments of the present systems and methods.

The various operations described herein, particularly in connection with FIGS. 1 through 4, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A post-incarceration digital re-entry system comprising:
a post-incarceration re-entry server configured to:
establish asynchronous communication that comprises video and text between an incarcerated individual and a correctional facility assigned supervisor of the incarcerated individual, and establish synchronous communication based at least in part on synchronized video that comprises audio and images between the incarcerated individual and the correctional facility assigned supervisor, wherein the audio and images of the synchronized video are captured by a plurality of microphones and a plurality of cameras that comprise at least one microphone and at least one camera disposed at a first location that is a location of the incarcerated individual, and at least one microphone and at least one camera disposed at a second location that is a location of the correctional facility assigned supervisor, and wherein the second location is remote from the first location, for re-entry counseling support, comprising:
grant, to the incarcerated individual, conditioned on validated biometric input authentication of the incarcerated individual to a first computing device and network verification of a current location of the first computing device verified as the first location, wherein the first computing device comprises an incarcerated individual's personal communication and/or media device, via the first computing device, access to a first instance of a post-incarceration re-entry application program on the incarcerated individual's personal communication and/or media device at the first location, wherein the incarcerated individual's personal communication and/or media device is adapted for use in a correctional facility based at least in part on administrative privilege applied to an operating system of the incarcerated individual's personal communication and/or media device to limit apps executable by the incarcerated individual's personal communication and/or media device to a restricted set of apps that comprises the first instance of the post-incarceration re-entry application program, and to limit network connection by the incarcerated individual's personal communication and/or media device to a restricted set of networks that comprises a network governed by the correctional facility, and wherein the incarcerated individual's personal communication and/or media device is configured to provide an interface, based at least in part on the first instance of the post-incarceration re-entry application program, to accept, from the authenticated incarcerated individual at the verified first location, identification of one or more needs and/or one or more objectives;
enable access by the correctional facility assigned supervisor of the incarcerated individual to the post-incarceration digital re-entry system via a second instance of the post-incarceration re-entry application program on a second computing device at the second location; and
maintain asynchronous communication and maintain access to synchronized video communication between the authenticated incarcerated individual and the correctional facility assigned supervisor of the incarcerated individual for re-entry counseling support via the incarcerated individual's personal communication and/or media device at the verified first location and the second computing device at the second location, comprising:
present one or more suggestions of available programs, plans, and/or organizations output from a machine learning model configured and trained to determine programs, plans, and/or organizations to address or fulfill one or more identified needs and/or one or more identified objectives received from the incarcerated individual's as input to the machine learning model, to the correctional facility assigned supervisor of the incarcerated individual, via the second instance of the post-incarceration re-entry application program on the second computing device;

accept assignment by the correctional facility assigned supervisor, to the incarcerated individual, one or more tasks comprising at least one of the suggestions output from the machine learning model to be completed by the incarcerated individual to achieve each of the one or more needs and/or one or more objectives identified, via the second instance of the post-incarceration re-entry application program on the second computing device;

notify, via the first instance of the post-incarceration re-entry application program, on the incarcerated individual's personal communication and/or media device, the incarcerated individual of the one or more tasks to be completed by the incarcerated individual to achieve each of the one or more needs and/or one or more objectives;

track and/or accept input from the incarcerated individual to indicate, via the first instance of the post-incarceration re-entry application program on the incarcerated individual's personal communication and/or media device, progress in completion of, each of the one or more tasks by the incarcerated individual; and report to the correctional facility assigned supervisor of the incarcerated individual, via the second instance of the post-incarceration re-entry application program on the second computing device, the progress in completion of, each of the one or more tasks by the incarcerated individual.

2. The post-incarceration digital re-entry system of claim 1, wherein the post-incarceration re-entry server is further configured to accept from the correctional facility assigned supervisor of the incarcerated individual via the second instance of the post-incarceration re-entry application program, and/or a court or agency having jurisdiction over the incarcerated individual via a third party device or program, identification of one or more needs and/or one or more objectives.

3. The post-incarceration digital re-entry system of claim 1, wherein the post-incarceration re-entry server is further configured to:

accept, from a third party having a vested interest in the incarcerated individual, via a third instance of the post-incarceration re-entry application program, identification of one or more needs and/or one or more objectives;

notify, via the third instance of the post-incarceration re-entry application program, the third party of the one or more tasks to be completed by the incarcerated individual to achieve each of the one or more needs and/or one or more objectives; and report to the third party completion of, and/or progress in completing, each of the one or more tasks by the incarcerated individual, via the third instance of the post-incarceration re-entry application program.

4. The post-incarceration digital re-entry system of claim 1, wherein the machine learning model further comprises a neural network trained:

based at least in part on labeled historical outcome data representing outcomes of incarcerated individuals with identified needs and experiences with historical programs, plans, and organizations.

5. The post-incarceration digital re-entry system of claim 1, wherein the machine learning model is further configured and trained to prioritize the suggestions based at least in part on output of an available program, plan, or organization suggestions ranked based at least in part on predicted outcome.

6. The post-incarceration digital re-entry system of claim 1, wherein the post-incarceration re-entry server is further configured to send, via a third party device or program, a message or a notification to the incarcerated individual to grant the access to the first instance of the post-incarceration re-entry application program on the incarcerated individual's personal communication and/or media device.

7. The post-incarceration digital re-entry system of claim 1, wherein the incarcerated individual's personal communication and/or media device is further configured to present an interface, via at least the first instance of the post-incarceration re-entry application program, to access one or more education platforms, job platforms and/or housing platforms, each providing one or more respective educational programs, job opportunities and/or housing opportunities, identified in the one or more tasks to be completed by the incarcerated individual.

8. The post-incarceration digital re-entry system of claim 7, wherein the post-incarceration re-entry server is further configured to provide web-based access to the one or more education platforms, job platforms and/or housing platforms, to the incarcerated individual via a third party computing device that comprises a desktop computer, mobile phone, or tablet computer, following release of the incarcerated individual from the correctional facility.

9. The post-incarceration digital re-entry system of claim 1, wherein the incarcerated individual's personal communication and/or media device is further configured to present, via the first instance of the post-incarceration re-entry application program, an interface to access one or more vendors outside the correctional facility, each vendor associated with one or more of the one or more tasks to be completed by the incarcerated individual.

10. A post-incarceration re-entry method comprising:

establishing, by a post-incarceration re-entry server, asynchronous communication that comprises video and text between an incarcerated individual and a correctional facility assigned supervisor of the incarcerated individual, and establishing synchronous communication based at least in part on synchronized video that comprises audio and images between the incarcerated individual and the correctional facility assigned supervisor, wherein the audio and images of the synchronized video are captured by a plurality of microphones and a plurality of cameras that comprise at least one microphone and at least one camera disposed at a first location that is a location of the incarcerated individual, and at least one microphone and at least one camera disposed at a second location that is a location of the correctional facility assigned supervisor, and wherein the second location is remote from the first location, for re-entry counseling support, by:

granting, by the post-incarceration re-entry server to the incarcerated individual, conditioned on validated biometric input authentication of the incarcerated individual to a first computing device and network verification of a current location of the first computing device verified as the first location, wherein the first computing device comprises an incarcerated individual's personal communication and/or media device, via the first computing device adapted for use in a correctional facility, access to a first instance of a post-incarceration re-entry application program on the incarcerated individual's personal communication and/or media device at the first location;

enabling, by the post-incarceration re-entry server, access by the correctional facility assigned supervisor of the incarcerated individual to a second instance of the post-incarceration re-entry application program on a second computing device at the second location; and maintaining, by the post-incarceration re-entry server, asynchronous communication and maintaining access to synchronized video communication between the authenticated incarcerated individual and the correctional facility assigned supervisor of the incarcerated individual for re-entry counseling support via the incarcerated individual's personal communication and/or media device at the verified first location and the second computing device at the second location, comprising:

providing, at the first location by the post-incarceration re-entry server via the first instance of the post-incarceration re-entry application program on the incarcerated individual's personal communication and/or media device, an interface to accept from the incarcerated individual, identification of one or more needs and/or one or more objectives;

determining, by the post-incarceration re-entry server using a machine learning model configured and trained to determine programs, plans, and/or organizations to address or fulfill one or more needs and/or one or more objectives supplied as input to the machine learning model, output suggestions of available programs, plans, and/or organizations to address or fulfill one or more identified needs and/or one or more identified objectives received from the incarcerated individual as input to the machine learning model;

presenting, by the post-incarceration re-entry server via the second instance of the post-incarceration re-entry application program on the second computing device at the second location, the one or more identified needs and/or one or more objectives received from the incarcerated individual and the suggestions of available programs, plans, and/or organizations determined and output by the machine learning model, to the correctional facility assigned supervisor of the incarcerated individual;

accepting, by the post-incarceration re-entry server via the second instance of the post-incarceration re-entry application program on the second computing device at the second location, assignment by the correctional facility assigned supervisor, to the incarcerated individual, one or more tasks comprising at least one suggestion determined by the machine learning model to be completed by the incarcerated individual to achieve each of the one or more needs and/or one or more objectives identified;

notifying, by the post-incarceration re-entry server, via the first instance of the post-incarceration re-entry application program, on the incarcerated individual's personal communication and/or media device, the incarcerated individual of the one or more tasks to be completed by the incarcerated individual to achieve each of the one or more needs and/or one or more objectives;

tracking and/or accepting input from the incarcerated individual indicating, to the post-incarceration re-entry server, via the first instance of the post-incarceration re-entry application program on the incarcerated individual's personal communication and/or media device, progress in completing, and/or completion of, each of the one or more tasks by the incarcerated individual; and reporting, by the post-incarceration re-entry server, to the correctional facility assigned supervisor of the incarcerated individual, via the second instance of the post-incarceration re-entry application program on the second computing device, the completion of, and/or the progress in completing, each of the one or more tasks by the incarcerated individual.

11. The method of claim 10, further comprising accepting, by the post-incarceration re-entry server via the second instance of the post-incarceration re-entry application program, from the correctional facility assigned supervisor of the incarcerated individual, and/or a court or agency having jurisdiction over the incarcerated individual, identification of one or more needs and/or one or more objectives.

12. The method of claim 10, further comprising:
accepting, by the post-incarceration re-entry server via a third party device or application, from a third party having a vested interest in the incarcerated individual, identification of one or more needs and/or one or more objectives;

notifying, by the post-incarceration re-entry server via the third party device or application, the third party of the one or more tasks to be completed by the incarcerated individual to achieve each of the one or more needs and/or one or more objectives; and reporting, by the post-incarceration re-entry server via the third party device or application, to the third party completion of, and/or progress in completing, each of the one or more tasks by the incarcerated individual.

13. The method of claim 10, wherein the machine learning model further comprises a neural network, and wherein the method further comprises:
training the neural network using supervised learning and backpropagation, based at least in part on labeled historical outcome data representing outcomes of incarcerated individuals with identified needs and experiences with historical programs, plans, and organizations.

14. The method of claim 10, wherein the method further comprises granting the incarcerated individual access to the post-incarceration re-entry application program based at least in part on the post-incarceration re-entry server sending a message or a notification to the incarcerated individual granting the access to the first instance of the post-incarceration re-entry application program on the incarcerated individual's personal communication and/or media device.

15. The method of claim 10, further comprising presenting, by the first instance of the post-incarceration re-entry application program, via the incarcerated individual's personal communication and/or media device, an interface accessing one or more education platforms, job platforms and/or housing platforms, each providing one or more respective educational programs, job opportunities and/or housing opportunities, identified in the one or more tasks to be completed by the incarcerated individual.

16. The method of claim 15, further comprising presenting the interface accessing one or more education platforms, job platforms and/or housing platforms, to the incarcerated individual following release of the incarcerated individual from the correctional facility, via a third party computing device that comprises a desktop computer, mobile phone, or tablet computer.

17. The method of claim 16, wherein the interface presented to the incarcerated individual following release of the incarcerated individual from the correctional facility is a web-based interface.

18. The method of claim 10, further comprising presenting, by the first instance of the post-incarceration re-entry application program, via the incarcerated individual's personal communication and/or media device, an interface accessing one or more vendors outside the correctional facility, each vendor associated with one or more of the one or more tasks to be completed by the incarcerated individual.

* * * * *